United States Patent
Matsumoto (10) Patent No.: US 7,306,007 B2
(45) Date of Patent: Dec. 11, 2007

(54) PIPE COUPLING INCLUDING BALL VALVE (75) Inventor: Koji Matsumoto, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 138 days.

(21) Appl. No.: 10/541,365

(22) PCT Filed: Feb. 19, 2003

(86) PCT No.: PCT/JP03/01787

§ 371 (c)(1),
(2), (4) Date: Jul. 6, 2005

(87) PCT Pub. No.: WO2004/074730

PCT Pub. Date: Sep. 2, 2004

(65) Prior Publication Data

US 2006/0108009 A1    May 25, 2006

(51) Int. Cl.
*F16L 37/36* (2006.01)
(52) U.S. Cl. .................. 137/614.06; 137/240
(58) Field of Classification Search ........... 137/614.04, 137/614.05, 614.06, 613, 240; 251/149.1, 251/149.9
See application file for complete search history.

(56) References Cited

U.S. PATENT DOCUMENTS

| 4,125,128 A | 11/1978 | Elward et al. |
| 4,548,237 A * | 10/1985 | Bogenschutz .......... 137/625.22 |
| 5,095,947 A | 3/1992 | Weh et al. |
| 5,148,839 A * | 9/1992 | Kirwan et al. ............... 137/614 |
| 5,209,528 A | 5/1993 | Weh et al. |
| 5,413,309 A * | 5/1995 | Giesler ................... 137/614.06 |

(Continued)

FOREIGN PATENT DOCUMENTS

JP           54-3159           1/1959

(Continued)

OTHER PUBLICATIONS

International Search Report of PCT/JP03/01787, mailed Apr. 30, 2003.

*Primary Examiner*—Kevin Lee
(74) *Attorney, Agent, or Firm*—Nixon & Vanderhye P.C.

(57) ABSTRACT

A pipe coupling is provided that facilitates an operation of opening or closing a ball valve and suppresses damage to a cylindrical seal member by the ball valve when rotated, thereby enabling an improvement in durability. A socket fluid passage (4) in a socket (1) is opened or closed with a ball valve (5). A cylindrical seal member (11) is disposed in a primary fluid passage portion (4a) of the socket fluid passage (4) in such a manner as to be in pressure contact with the ball valve (5) to seal between the ball valve (5) and the inner wall of the socket fluid passage (4). The ball valve (5) is rotatable to open when the socket (1) and a plug (2) are locked to each other by a lock mechanism (16). The ball valve (5) is provided with a sub-valve bore (33) that allows fluid in the primary fluid passage portion (4a) to be delivered to a secondary fluid passage portion (4b) of the socket fluid passage (4) through the ball valve (5) before a valve bore (7) of the ball valve (5) opens into the socket fluid passage (4) when the ball valve (5) is rotated.

4 Claims, 6 Drawing Sheets

U.S. PATENT DOCUMENTS 5,785,074 A 7/1998 Kieper
6,089,539 A 7/2000 Kouda
2006/0118184 A1 6/2006 Mikiya et al.

FOREIGN PATENT DOCUMENTS

| | | |
|---|---|---|
| JP | 8-3357 | 1/1996 |
| JP | 8-82395 | 3/1996 |
| JP | 2694302 | 9/1997 |
| JP | 11-108279 | 4/1999 |
| JP | 11-108279 A | 4/1999 |
| WO | WO 94/13990 | 6/1994 |

* cited by examiner

PIPE COUPLING INCLUDING BALL VALVE

This application is the U.S. national phase of international application PCT/JP2003/001787, filed 19 Feb. 2003, which designated the U.S., the entire content of which is hereby incorporated by reference.

TECHNICAL FIELD TO WHICH THE INVENTION PERTAINS

The present invention relates to a pipe coupling and, more particularly, to a pipe coupling suitable for use to connect or disconnect a path for supplying a high-pressure fluid.

BACKGROUND OF THE INVENTION

The following type of pipe coupling is generally frequently used to connect or disconnect a path for supplying a high-pressure fluid. The pipe coupling incorporates a valve element opened or closed by a manual operation. The operation for opening or closing the valve element is conducted as follows. The valve element is opened after the completion of connection between a socket and a plug that constitute the pipe coupling. The plug is disconnected from the socket after the completion of the operation for closing the valve element. Thus, the operating procedure is restricted.

A conventional pipe coupling of the above-described type is disclosed in Japanese Patent No. 2,694,302. This pipe coupling has three valve elements constituting an inlet valve member, a vent valve member, and an outlet valve member, respectively. The three valve elements are disposed in series in the pipe coupling. Accordingly, the overall length of the pipe coupling is unfavorably long, and the pressure loss is undesirably large. Consequently, the packing efficiency is degraded.

Under these circumstances, a pipe coupling has been proposed in which a ball valve is used as a valve element for opening or closing a fluid passage, thereby reducing the pressure loss while making the whole structure compact.

However, if a conventionally known ball valve is employed as it is, in a pipe coupling for a high-pressure fluid under a high-pressure environment, the following problem arises. In the pipe coupling, a seal is effected between the ball valve and the primary fluid passage portion of a socket fluid passage. Therefore, the pressure of a fluid acting in the primary fluid passage portion of the socket fluid passage is applied as a large back pressure to a cylindrical seal member that is disposed in the primary fluid passage portion in such a manner as to be in pressure contact with the ball valve to seal between the ball valve and the inner wall of the socket fluid passage.

Accordingly, the cylindrical seal member offers a large resistance to the ball valve as it is rotated, making it difficult to perform the operation for opening or closing the ball valve. Further, because a high pressure acts only on the primary fluid passage side of the ball valve, a ball rotating shaft which rotates the ball valve is undesirably decentered by the pressure. This also makes it difficult to perform the ball valve open-close operation.

Further, the cylindrical seal member is strongly pressed against the ball valve under the high pressure of the fluid. Therefore, the seal member may be worn away and damaged by the opening edge of the valve bore of the ball valve when rotated.

SUMMARY OF THE INVENTION

An object of the present invention is to provide a pipe coupling that facilitates the ball valve open-close operation and suppresses damage to the cylindrical seal member by the ball valve when rotated, thereby enabling an improvement in durability.

Another object of the present invention is to provide a pipe coupling that enables recovery of a purged fluid from the pipe coupling, and allows the plug to be disconnected from the socket safely and easily owing to the recovery of the purged fluid.

The structure of the present invention for attaining the above-described objects is as follows.

According to a first aspect, the present invention provides a pipe coupling including a socket and a plug that have an appropriate lock mechanism and are detachably connected to each other. The socket has a socket fluid passage that is opened or closed with a ball valve incorporated therein. The socket fluid passage has a primary fluid passage portion through which a fluid is supplied into the socket. The primary fluid passage portion is provided therein with a cylindrical seal member in pressure contact with the ball valve to seal between the ball valve and the inner wall of the socket fluid passage. The ball valve is rotatable to open when the socket and the plug are locked to each other by the lock mechanism. The ball valve is provided with a sub-valve bore that allows the fluid in the primary fluid passage portion of the socket fluid passage to be delivered to a secondary fluid passage portion of the socket fluid passage through the ball valve before a valve bore of the ball valve opens into the socket fluid passage when the ball valve is rotated.

With the above-described arrangement, if the ball valve in its closed position is rotated after completion of connection of the socket and the plug by the lock mechanism, before the valve bore of the ball valve opens into the primary fluid passage portion of the socket fluid passage, the sub-valve bore of the ball valve passes the cylindrical seal member to open into the primary fluid passage portion, thereby allowing the fluid in the primary fluid passage portion to be delivered from the sub-valve bore to the secondary fluid passage portion of the socket fluid passage, including the outer peripheral surface of the ball valve, through the gap between the ball valve inner wall and the outer wall of the ball rotating shaft. Consequently, the differential pressure between the fluid pressure in the primary fluid passage portion and that in the secondary fluid passage portion reduces, so that the load applied to the cylindrical seal member on the primary fluid passage side reduces. Therefore, the ball valve rotating operation, which is carried out thereafter, is facilitated. In addition, it is possible to suppress damage to the cylindrical seal member, which might otherwise be caused by the opening edge of the valve bore of the ball valve when the valve bore passes the cylindrical seal member as the ball valve further rotates. Hence, the durability of the cylindrical seal member increases.

According to a second aspect of the present invention, the secondary fluid passage portion of the socket fluid passage in the pipe coupling according to the first aspect is provided with a movable valve that retracts to open the secondary fluid passage portion when it is pushed by the distal end of the plug as inserted into the socket. When the plug is removed from the socket, the movable valve advances to close the secondary fluid passage portion. The ball valve has a ball rotating shaft to rotate it. The ball rotating shaft is formed with a purge passage having a purge inlet that opens into a secondary space formed in the secondary fluid passage portion between the ball valve and the movable valve. The purge passage further has a purge outlet that opens outside the socket fluid passage. The purge outlet is capable of assuming either of two positions; namely, a position where the purge outlet communicates with a fluid recovery passage provided in the socket, and a position where it does not, according to a difference in rotation angle of the ball rotating shaft. When the rotation angle of the ball rotating shaft coincides with an angle at which the valve bore of the ball valve is open into the socket fluid passage, the purge outlet is not in communication with the fluid recovery passage. When the rotation angle of the ball rotating shaft is such that the valve bore of the ball valve is not open into the socket fluid passage, the purge outlet is in communication with the fluid recovery passage.

According to the above-described structure, the secondary fluid passage portion of the socket fluid passage is provided with a movable valve that retracts to open the secondary fluid passage portion when it is pushed by the distal end of the plug as inserted into the socket. When the plug is removed from the socket, the movable valve advances to close the-secondary fluid passage portion. Therefore, even if the ball valve is rotated to open when the plug is not connected to the socket, the fluid flowing from the primary fluid passage portion to the secondary fluid passage portion is prevented from leaking to the outside of the socket by the movable valve closing the secondary fluid passage portion. Further, the ball rotating shaft for rotating the ball valve is formed with a purge passage having a purge inlet that opens into a secondary space formed in the secondary fluid passage portion between the ball valve and the movable valve. The purge passage further has a purge outlet that opens outside the socket fluid passage. The purge outlet is capable of assuming either of two positions; namely a position where the purge outlet communicates with a fluid recovery passage provided in the socket, and a position where it does not, according to a difference in rotation angle of the ball rotating shaft. When the rotation angle of the ball rotating shaft is such that the valve bore of the ball valve is not open into the socket fluid passage, the purge outlet and the fluid recovery passage are in communication with each other. Therefore, when the plug is to be disconnected from the socket, if the ball rotating shaft is rotated to close the ball valve, the purge outlet and the fluid recovery passage come in communication with each other, thereby allowing the fluid in the secondary fluid passage portion of the socket and in the plug to be recovered from the fluid recovery passage through the purge passage formed in the ball rotating shaft. Recovery of the fluid from the socket secondary fluid passage portion and the plug enables the plug to be disconnected from the socket safely and easily.

According to a third aspect of the present invention, a cylindrical seal member is disposed at a communicating opening of the fluid recovery passage that is communicable with the purge outlet of the purge passage formed in the ball rotating shaft in the pipe coupling according to the second aspect. The cylindrical seal member is in pressure contact with the ball rotating shaft to seal between the ball rotating shaft and the inner wall of the fluid recovery passage when the purge outlet and the fluid recovery passage are not in communication with each other. In addition, a pressure balancing member is disposed at a side of the ball rotating shaft opposite to the pressure contact position of the cylindrical seal member disposed in the fluid recovery passage. The pressure balancing member applies a contact pressure to the ball rotating shaft that balances the contact pressure applied by the cylindrical seal member.

With the above-described arrangement, the portion of the ball rotating shaft where the purge outlet is provided is subjected to back pressures at both sides of the ball rotating shaft. Consequently, radial loads applied to the ball rotating shaft balance each other. Accordingly, the bending moment acting on the purge outlet portion of the ball rotating shaft is theoretically zero. Thus, it is possible to improve both the rotational operability of the ball rotating shaft and the sealability of the cylindrical seal member.

According to a fourth aspect of the present invention, the lock mechanism of the socket and the plug in the pipe coupling according to the second or third aspect includes a locking sleeve fitted on the outer periphery of the distal end portion of the socket body. When advanced, the locking sleeve presses lock members in a centripetal direction. When retracted, the locking sleeve releases the lock members from its pressing action. The lock mechanism further includes an engaging groove formed on the outer periphery of the plug. The engaging groove is engageable with the lock members. The ball rotating shaft is provided with a handle for rotating it outside the socket body and is further provided with a cam rotating together with the ball rotating shaft as one unit. The cam has a first control portion and a second control portion. The locking sleeve is provided with an abutment. When the locking sleeve is in its retracted position, the abutment is positioned in close proximity to the second control portion of the cam, so that if the cam is attempted to be rotated, the abutment abuts on the second control portion to prevent rotation of the cam, thereby preventing the ball valve from being opened. When the locking sleeve is in its advanced position, the abutment is away from the cam to allow rotation of the cam. If the locking sleeve is attempted to be retracted when it is in its advanced position and the ball valve is open, the abutment abuts on the first control portion of the cam to prevent retraction of the locking sleeve that is in its advanced position.

With the above-described arrangement, when the plug is not connected to the socket, the ball valve cannot be opened. The plug cannot be disconnected from the socket unless the ball valve is closed. Thus, the pipe coupling has high safety.

According to a fifth aspect of the present invention, the cam in the pipe coupling according to the fourth aspect is in the shape of a partially cut disk. A circular arc-shaped outer peripheral edge of the cam is defined as the first control portion, and a cut portion of the cam is defined as the second control portion.

With this arrangement, the production of the first and second control portions is facilitated, and an overall cost reduction can be achieved.

PREFERRED EMBODIMENTS OF THE INVENTION

Figure 1:
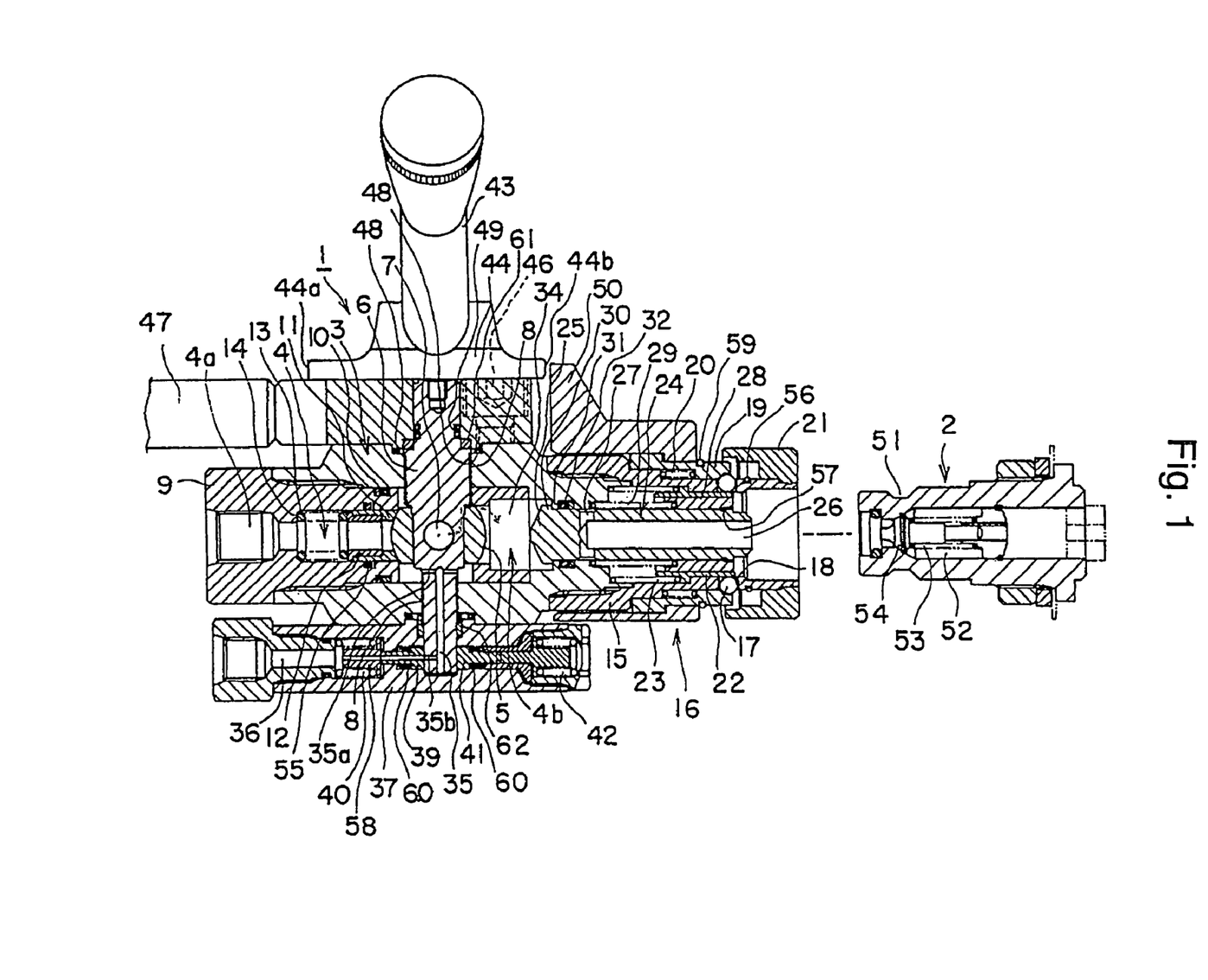
FIG. 1 is a longitudinal sectional side view showing an embodiment of the pipe coupling according to the present invention before a socket and a plug are connected to each other.
Figure 2:
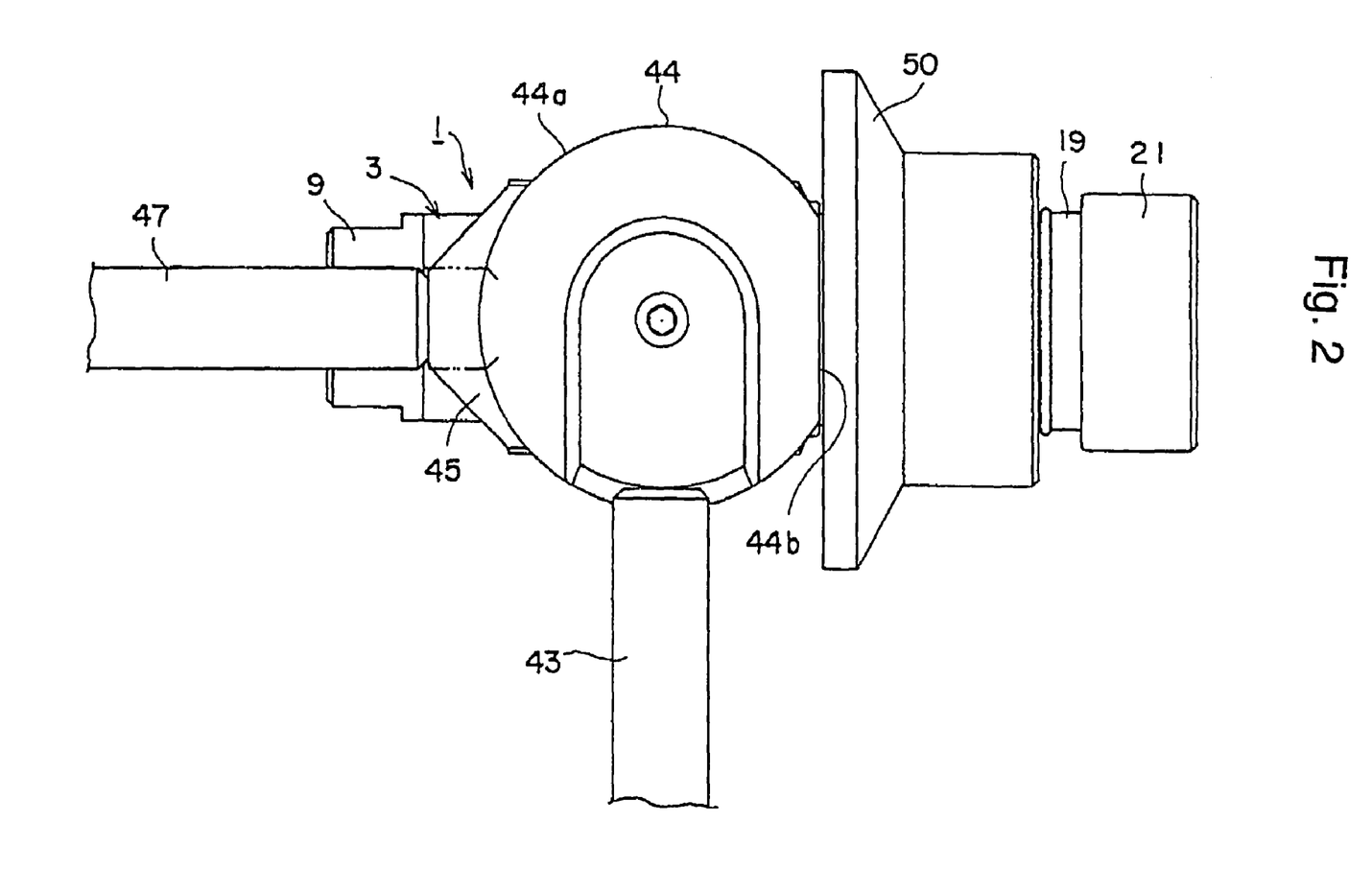
FIG. 2 is a plan view of the socket shown in FIG. 1.
Figure 3:
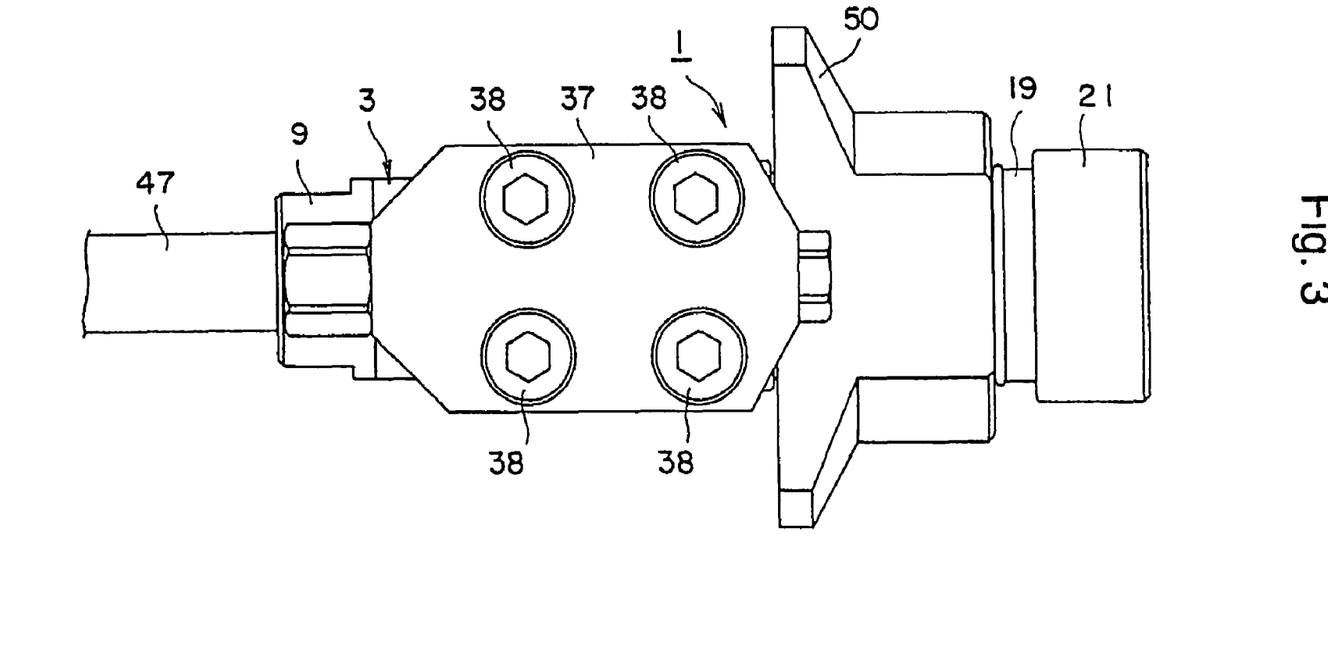
FIG. 3 is a partially omitted bottom view of the socket shown in FIG. 1.
Figure 4A:
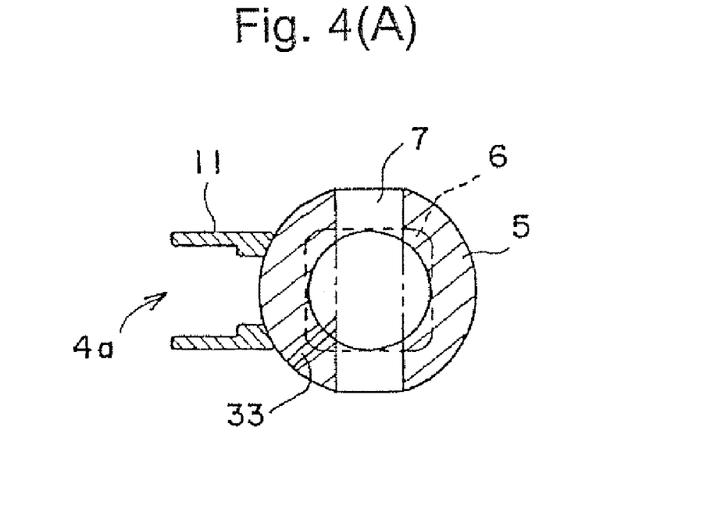
FIG. 4(A) is a transverse sectional view illustrating the operational relationship between a ball valve used in the embodiment and a cylindrical seal member-disposed in a primary fluid passage portion of a socket fluid passage.
Figure 4B:
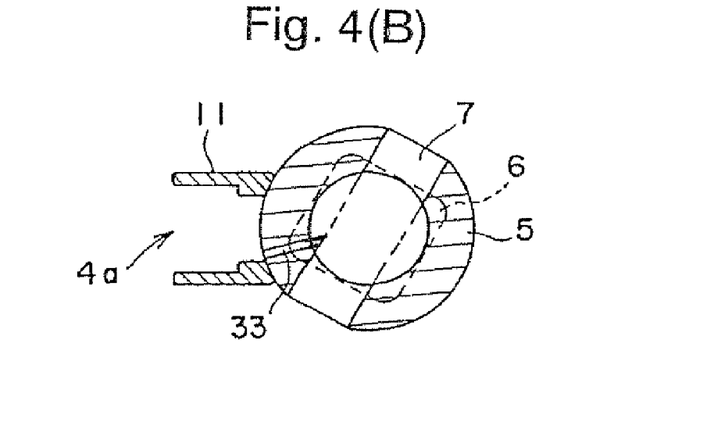
FIG. 4(B) is a transverse sectional view illustrating the operational relationship between the ball valve used in the embodiment and the cylindrical seal member disposed in the primary fluid passage portion of the socket fluid passage.
Figure 4C:
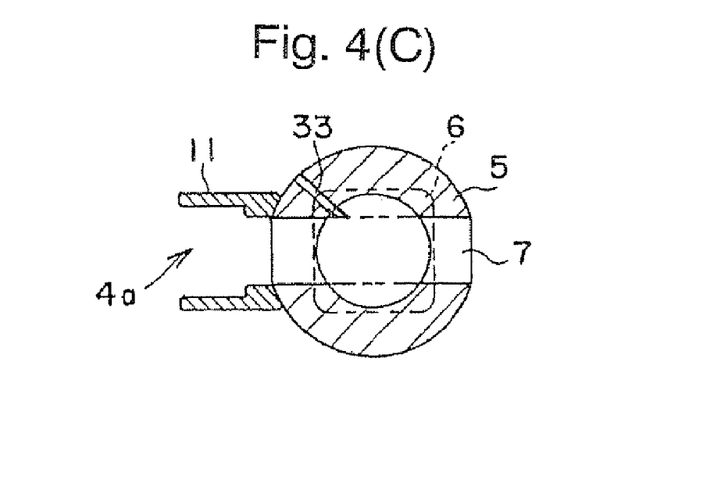
FIG. 4(C) is a transverse sectional view illustrating the operational relationship between the ball valve used in this embodiment and the cylindrical seal member disposed in the primary fluid passage portion of the socket fluid passage.
Figure 5A:
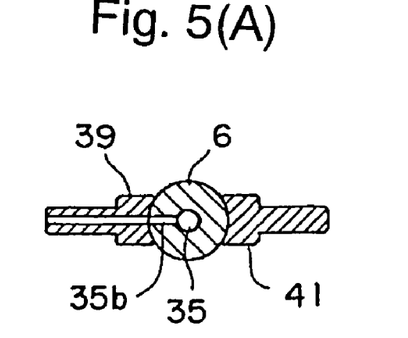
FIG. 5(A) is a transverse sectional view illustrating the operational relationship between a purge outlet of a purge passage formed in a ball rotating shaft for rotating the ball valve used in the embodiment, and a cylindrical seal member disposed at a communicating opening of a fluid recovery passage, and further a pressure balancing member disposed at a side of the ball rotating shaft opposite to the pressure contact position of the cylindrical seal member.
Figure 5B:
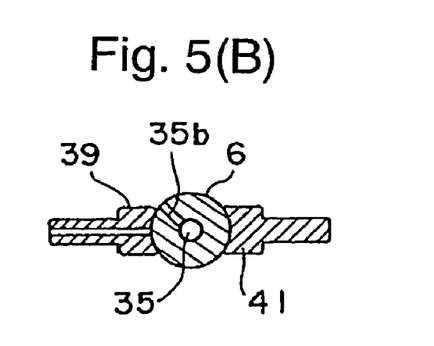
FIG. 5(B) is a transverse sectional view illustrating the operational relationship between the purge outlet of the purge passage formed in the ball rotating shaft for rotating the ball valve used in the embodiment, and the cylindrical seal member disposed at the communicating opening of the fluid recovery passage, and further the pressure balancing member disposed at the side of the ball rotating shaft opposite to the pressure contact position of the cylindrical seal member.
Figure 5C:
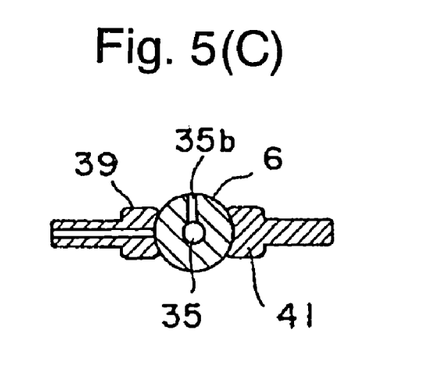
FIG. 5(C) is a transverse sectional view illustrating the operational relationship between the purge outlet of the purge passage formed in the ball rotating shaft for rotating the ball valve used in the embodiment, and the cylindrical seal member disposed at the communicating opening of the fluid recovery passage, and further the pressure balancing member disposed at the side of the ball rotating shaft opposite to the pressure contact position of the cylindrical seal member.
Figure 6:
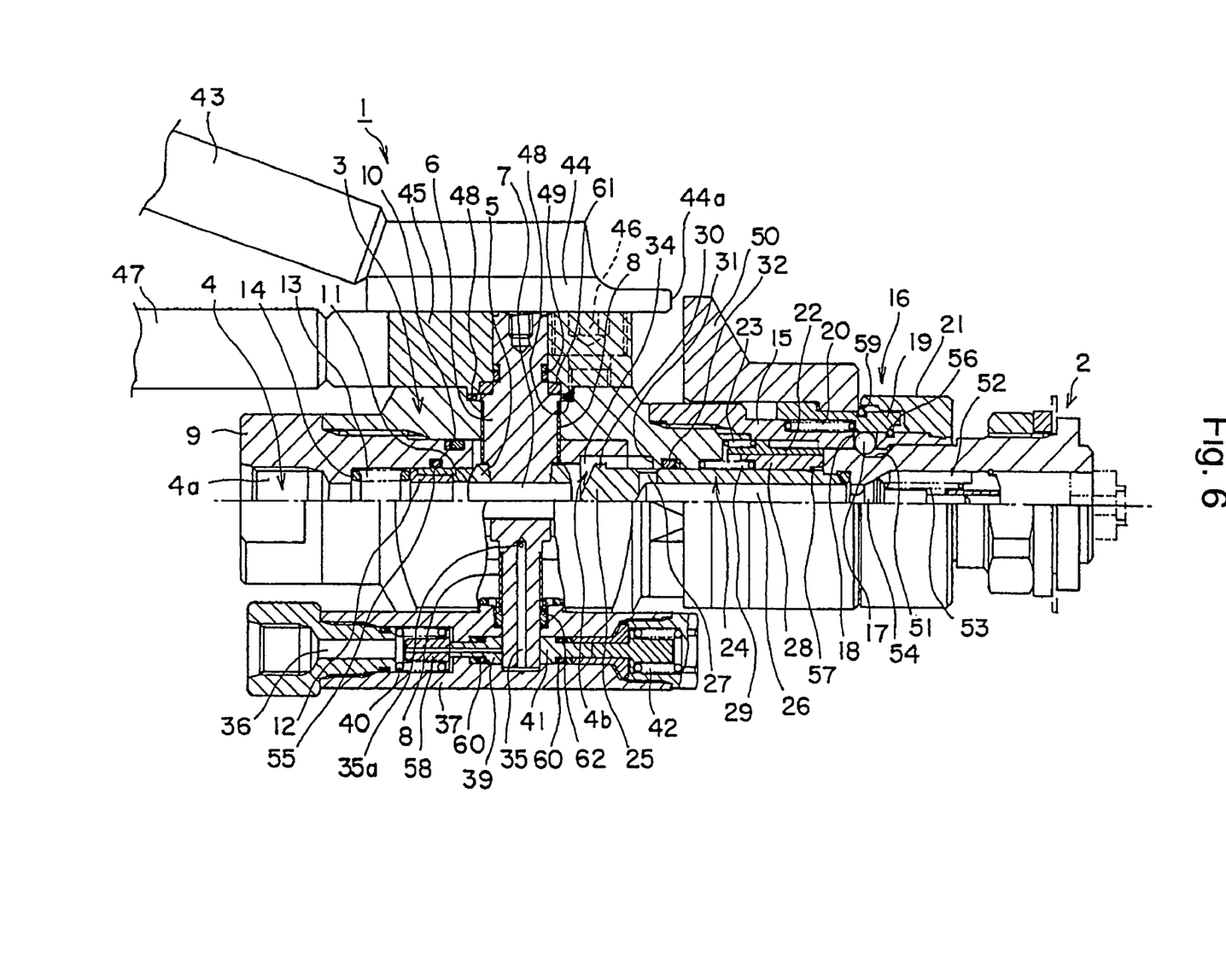
FIG. 6 is a partially longitudinally sectioned side view showing the pipe coupling according to the embodiment after the socket and the plug have been connected to each other.

FIGS. 1 to 6 show an embodiment of the pipe coupling according to the present invention. FIG. 1 is a longitudinal sectional side view showing a pipe coupling according to this embodiment before a socket and a plug are connected to each other. FIG. 2 is a plan view of the socket. FIG. 3 is a partially omitted bottom view of the socket. FIGS. 4(A), 4(B) and 4(C) are transverse sectional views illustrating the operational relationship between a ball valve used in this embodiment and a cylindrical seal member disposed in a primary fluid passage portion of a socket fluid passage. FIGS. 5(A), 5(B) and 5(C) are transverse sectional views illustrating the operational relationship between a purge outlet of a purge passage formed in a ball rotating shaft for rotating the ball valve used in this embodiment, and a cylindrical seal member disposed at a communicating opening of a fluid recovery passage, and further a pressure balancing member disposed at a side of the ball rotating shaft opposite to a position at which the cylindrical seal member is in pressure contact with the ball rotating shaft. FIG. 6 is a partially longitudinally sectioned side view showing the pipe coupling according to this embodiment after the socket and the plug have been connected to each other.

The pipe coupling according to this embodiment comprises a socket 1 and a plug 2 detachably connected to the socket 1. The socket 1 has a cylindrical socket body 3. The socket body 3 has a socket fluid passage 4 formed therein [more specifically, in a fixed cylindrical member 9 (described later)]. The socket fluid passage 4 has a ball valve 5 incorporated therein to open or close the socket fluid passage 4. One of two portions of the socket fluid passage 4 that face each other across the ball valve 5 is defined as a primary fluid passage portion 4a through which a fluid is supplied into the socket fluid passage 4. The other of the two portions of the socket fluid passage 4 is defined as a secondary fluid passage portion 4b through which the fluid is delivered from the socket fluid passage 4.

The ball valve 5 is rotated by a ball rotating shaft 6 extending vertically through the socket body 3. The ball rotating shaft 6 extending through the ball valve 5 has a quadrangular outer peripheral configuration so that it can rotate the ball valve 5 without slipping when the ball rotating shaft 6 is rotated. A valve bore 7 is provided to extend through both the ball valve 5 and the ball rotating shaft 6. The valve bore 7 is adapted to align with the primary fluid passage portion 4a and the secondary fluid passage portion 4b to open the socket fluid passage 4. Guides 8 are provided between the ball rotating shaft 6 and the socket body 3.

The socket body 3 has a fixed cylindrical member 9 screwed into the primary side thereof. The inside of the fixed cylindrical member 9 is defined as the primary fluid passage portion 4a. The area between the socket body 3 and the fixed cylindrical member 9 is sealed with a seal ring 10 accompanied by a backup ring.

The inner periphery of the fixed cylindrical member 9 is fitted with a cylindrical seal member 11 that seals between the ball valve 5 and the inner wall of the primary fluid passage portion 4a, that is, the inner wall of the fixed cylindrical member 9. The cylindrical seal member 11 is urged to be in pressure contact with the ball valve 5 by a spring 13 through a movable cylinder 12. The proximal end of the spring 13 is supported by a stepped portion 14 of the fixed cylindrical member 9. The inner wall of the fixed cylindrical member 9 is provided with a seal ring 55 for sealing the outer peripheral surface of the movable cylinder 12.

The secondary side of the socket body 3 has a cylindrical member 15 screwed on the outer periphery of a distal end portion thereof. The cylindrical member 15 is integrated with the socket body 3 to constitute a distal end portion of the socket body 3. The cylindrical member 15 has on its distal end portion a lock mechanism 16 for connecting together the socket 1 and the plug 2. The lock mechanism 16 in this embodiment is arranged as follows. The cylindrical member 15 has a plurality of circumferentially spaced lock member fitting holes 18 fitted with respective lock members 17, e.g. balls. A locking sleeve 19 is axially movably fitted on the outer periphery of the cylindrical member 15. When advanced, the locking sleeve 19 presses the lock members 17 in a centripetal direction (radially inward). When retracted, the locking sleeve 19 releases the lock members 17 from its pressing action. The locking sleeve 19 is urged by a spring 20 in the direction in which it is advanced. A stopper 56 is provided on the outer periphery of the distal end of the cylindrical member 15. The stopper 56 abuts on the locking sleeve 19 when advanced to prevent it from falling off the cylindrical member 15. A protection cylinder 21 also serving as a stopper is secured to the distal end of the cylindrical member 15 to prevent deposition of dust or the like to the lock member fitting holes 18.

A collar 22 is axially movably fitted in the cylindrical member 15. When positioned in its advancing position, the collar 22 supports the lock members 17 in a centrifugal direction (radially outward). When retracted, the collar 22 separates from the lock members 17 to allow them to move in the centripetal direction. The collar 22 is urged by a spring 23 in the direction in which it is advanced. The collar 22 is retracted by being pushed with the distal end of the plug 2 when the socket 1 and the plug 2 are connected to each other.

A movable valve 24 is axially movably provided in the secondary fluid passage portion 4b of the socket body 3. The movable valve 24 is retracted to open the secondary fluid passage portion 4b by being pushed with the distal end of the plug 2 when the socket 1 and the plug 2 are connected to each other. When the plug 2 is disconnected from the socket body 3, the movable valve 24 is advanced to close the secondary fluid passage portion 4b. The secondary fluid passage portion 4b is large in diameter at its end closer to the ball valve 5. The portion of the secondary fluid passage portion 4b closer to its distal end (remote from the ball valve 5) is small in diameter. The movable valve 24 is slidably fitted in a portion of the socket body 3 that constitutes the small-diameter portion of the secondary fluid passage portion 4b. A secondary space 34 is formed in the secondary fluid passage portion 4b between the ball valve 5 and the movable valve 24.

The movable valve 24 is a cylindrical member open at the front end and closed at the rear end. The closed rear end portion of the movable valve 24 is defined as a valve head 25. A fluid passage 26 is defined in the cylindrical movable valve 24. A communicating hole 27 is formed in the cylindrical wall of the movable valve 24 at a position closer to the rear end thereof. The communicating hole 27 provides communication between the inside and outside of the cylindrical movable valve 24. A cylindrical member 28 is slidably fitted on the outer periphery of the movable valve 24. The cylindrical member 28 is slidably fitted to the inner periphery of the collar 22. The cylindrical member 28 is engaged with a stop ring 57 provided on the distal end portion of the movable valve 24, thereby being stopped from further advancing. The cylindrical member 28 is urged in the direction in which it is advanced by a spring 29 interposed between the cylindrical member 28 and the socket body 3. The movable valve 24 is also urged in the direction in which it is advanced by the spring 29 through the cylindrical member 28. The valve head 25 is formed with a collar portion 30. The collar portion 30 is adapted to abut on a stepped portion 31 formed at the boundary between the large- and small-diameter portions of the secondary fluid passage portion 4b, thereby limiting the position of the movable valve 24 when advanced.

When the movable valve 24 is in its advanced position, the area between the inner wall of the socket body 3 and the outer periphery of the valve head 25 of the movable valve 24 is sealed to close the secondary fluid passage portion 4b by a seal ring 32 fitted to the inner wall of a portion of the socket body 3 that constitutes the small-diameter portion of the secondary fluid passage portion 4b. When the movable valve 24 is in its retracted position, the communicating hole 27 formed in the cylindrical wall of the movable valve 24 opens to the large-diameter portion of the secondary fluid passage portion 4b, thereby allowing the large-diameter portion of the secondary fluid passage portion 4b to communicate with the fluid passage 26 of the movable valve 24, that is, allowing the secondary fluid passage portion 4b to open.

In this embodiment, the ball valve 5 is further provided with a small-diameter sub-valve bore 33 that extends through the valve bore 7. As the ball valve 5 is rotated, before the valve bore 7 of the ball valve 5 opens into the socket fluid passage 4, the sub-valve bore 33 opens into the primary fluid passage portion 4a of the socket fluid passage 4 [see FIG. 4(B)], thereby allowing the fluid in the primary fluid passage portion 4a to be delivered from the sub-valve bore 33 to the secondary fluid passage portion 4b of the socket fluid passage 4, including the outer peripheral surface of the ball valve 5, through the gap between the inner wall of the ball valve 5 and the outer wall of the ball rotating shaft 6 (as indicated by the dotted-line arrow in FIG. 1).

The ball rotating shaft 6 for rotating the ball valve 5 extends vertically through the socket body 3, as stated above. Both end portions of the ball rotating shaft 6 project outside the socket body 3. The ball rotating shaft 6 is formed with a purge passage 35 having a purge inlet 35a that opens into the secondary space 34 formed in the secondary fluid passage portion 4b between the ball valve 5 and the movable valve 24. The purge passage 35 further has a purge outlet 35b that opens outside the socket fluid passage 4. In this embodiment, the purge outlet 35b opens on a portion of the ball rotating shaft 6 that projects outside the socket body 3.

The socket body 3 has a fluid recovery passage member 37 secured with bolts 38 (see FIG. 3) to the side thereof from which the end portion of the ball rotating shaft 6 having the purge passage 35 projects. The fluid recovery passage member 37 has a fluid recovery passage 36 for recovering the purged fluid. The end portion of the ball rotating shaft 6 having the purge passage 35 is inserted into the fluid recovery passage member 37 in a gas-tight manner so that one end thereof is in perpendicular contact with an opening end portion of the fluid recovery passage 36 opened in the fluid recovery passage member 37 [more specifically, in perpendicular contact with a cylindrical seal member 39 (described later) disposed in the passage 36]. The purge outlet 35b can assume either of two positions; namely, a position where the purge outlet 35b communicates with the fluid recovery passage 36, and a position where it does not, according to a difference in rotation angle of the ball rotating shaft 6. That is, when the rotation angle of the ball rotating shaft 6 coincides with the angle at which the valve bore 7 of the ball valve 5 is open into the socket fluid passage 4, the purge outlet 35b is not in communication with the fluid recovery passage 36. When the rotation angle of the ball rotating shaft 6 is such that the valve bore 7 of the ball valve 5 is closed in the socket fluid passage 4, the purge outlet 35b is in communication with the fluid recovery passage 36.

More specifically, when neither of the valve bore 7 and the sub-valve bore 33 of the ball valve 5 are open into the primary fluid passage portion 4a of the socket fluid passage 4 [FIG. 4(A)], the purge outlet 35b is in communication with the fluid recovery passage 36 [FIG. 5(A)]. When the ball rotating shaft 6 is rotated to allow the sub-valve bore 33 of the ball valve 5 to open into the primary fluid passage portion 4a [FIG. 4(B)], the purge outlet 35b is not in communication with the fluid recovery passage 36 [FIG. 5(B)]. When the ball rotating shaft 6 is further rotated to allow the valve bore 7 of the ball valve 5 to open into the primary fluid passage portion 4a [FIG. 4(C)], the purge outlet 35b is also not in communication with the fluid recovery passage 36 [FIG. 5(C)].

A cylindrical seal member 39 is disposed at the communicating opening of the fluid recovery passage.36 that is communicable with the purge outlet 35b. The cylindrical seal member 39 is urged by a spring 40 through a movable cylindrical member 58 to be in pressure contact with the ball rotating shaft 6 to seal between the ball rotating shaft 6 and the inner wall of the fluid recovery passage 36 when the purge outlet 35b and the fluid recovery passage 36 are not in communication with each other. Further, a pressure balancing member 41 is disposed in the fluid recovery passage member 37 at a side of the ball rotating shaft 6 opposite to the pressure contact position of the cylindrical seal member 39 disposed in the fluid recovery passage 36. The pressure balancing member 41 applies a contact pressure to the ball rotating shaft 6 that balances the contact pressure applied by the cylindrical seal member 39. The pressure balancing member 41 has the same diameter as that of the cylindrical seal member 39 and is urged by a spring 42-having the same spring pressure as that of the spring 40 urging the cylindrical seal member 39 through the movable cylindrical member 58.

The other end portion of the ball rotating shaft 6 projecting outside the socket body 3 is provided with a handle 43 for rotating the ball rotating shaft 6 outside the socket body 3 and further provided with a cam 44 that rotates together with the ball rotating shaft 6 as one unit. The cam 44 is in the shape of a partially cut disk. A circular arc-shaped outer peripheral edge of the cam 44 is defined as a first control portion 44a. A cut portion of the cam 44 is defined as a second control portion 44b. A retaining plate 45 is provided between the socket body 3 and the cam 44 to retain the ball rotating shaft 6 so that it will not become detached from the socket body 3. The retaining plate 45 is secured to the socket body 3 with a bolt 46. A handle 47 is secured to the retaining plate 45 to allow an operator to hold the socket 1 when operating the handle 43 to turn the ball rotating shaft 6.

As has been stated above, a locking sleeve 19 is fitted on the distal end portion of the socket body 3, that is, on the outer periphery of the cylindrical member 15, as one of constituent elements of the lock mechanism 16 for connecting together the socket 1 and the plug 2. When advanced, the locking sleeve 19 presses the lock members 17 in the centripetal direction. When retracted, the locking sleeve 19 releases the lock members 17 from its pressing action. The locking sleeve 19 is provided with an abutment 50. When the locking sleeve 19 is in its retracted position, the abutment 50 is positioned in close proximity to the second control portion 44b of the cam 44. If the cam 44 is attempted to be rotated, the abutment 50 abuts on the second control portion 44b to prevent rotation of the cam 44, thereby preventing the ball valve 5 from being opened. When the locking sleeve 19 is in its advanced position, the abutment 50 is away from the cam 44 to allow rotation of the cam 44. If the locking sleeve 19 is attempted to be retracted when it is in its advanced position and the ball valve 5 is open, the abutment 50 abuts on the first control portion 44a of the cam 44 to prevent retraction of the locking sleeve 19 that is in its advanced position. The abutment 50 is secured to the locking sleeve 19 by a stop ring 59. The abutment 50 may, however, be integrally formed with the locking sleeve 19.

The plug 2 to be connected to the socket 1 arranged as stated above has a lock member engaging groove 51 formed on the outer periphery of the distal end portion thereof. The lock member engaging groove 51 is engageable with the lock members 17. The plug 2 has a movable valve 54 provided in a plug fluid passage 52 formed in the plug 2. When advanced by the urging force of a spring 53, the movable valve 54 closes the plug fluid passage 52. When retracted by the fluid pressure of the pressure fluid supplied from the socket 1, the movable valve 54 opens the plug fluid passage 52.

The pipe coupling arranged as stated above is in the state shown in FIG. 1 before the socket 1 and the plug 2 are connected to each other. In this state, the valve bore 7 and the sub-valve bore 33 of the ball valve 5 incorporated in the socket fluid passage 4 of the socket body 3 are at respective angles at which neither of them are open into the socket fluid passage 4 [FIG. 4(A)]. Thus, the socket fluid passage 4 is closed by the ball valve 5. The movable valve 24 in the secondary fluid passage portion 4b of the socket fluid passage 4 is at its advanced position. Accordingly, the secondary fluid passage portion 4b is also closed by the movable valve 24.

The locking sleeve 19, which constitutes the lock mechanism 16, is in its retracted position. If, in this state, the handle 43 provided on the ball rotating shaft 6 for rotating the ball valve 5 is operated to rotate the ball rotating shaft 6, the second control portion 44b of the cam 44 provided on the ball rotating shaft 6 abuts on the abutment 50 provided on the locking sleeve 19 that is in its retracted position, thereby preventing rotation of the cam 44. Therefore, the ball valve 5 cannot be opened.

In this state, the purge outlet 35b of the purge passage 35 formed in the ball rotating shaft 6 is in communication with the fluid recovery passage 36 [FIG. 5(A)].

In addition, seal rings 48 seal between the fluid recovery passage member 37, the retaining plate 45 and the socket body 3. A seal ring 49 seals between the ball rotating shaft 6 and the retaining plate 45. Seal rings 60 seal between the ball rotating shaft 6 and the fluid recovery passage member 37. A guide 61 is provided between the ball rotating shaft 6 and the retaining plate 45. A guide 62 is provided between the ball rotating shaft 6 and the fluid recovery passage member 37.

If, in this state, the plug 2 is inserted into the distal end portion of the socket 1, that is, the cylindrical member 15, the distal end of the plug 2 abuts on the collar 22, the cylindrical member 28 and the movable valve 24 in the course of the insertion of the plug 2, causing the collar 22, the cylindrical member 28 and the movable valve 24 to retract against the resilient forces of the springs 23 and 29. The retraction allows the lock members 17 fitted in the lock member fitting holes 18 to move in the centripetal direction. Consequently, the lock members 17 sit on the outer periphery of the plug 2. When the lock member engaging groove 51 formed on the outer periphery of the plug 2 comes directly below the lock members 17, the lock members 17 are pressed in the centripetal direction by the locking sleeve 19 to engage in the lock member engaging groove 51. The locking sleeve 19 is advanced by the urging force of the spring 20 to press the lock members 17 in the centripetal direction. Thus, the connection of the socket 1 and the plug 2 is completed. At this time, the movable valve 24 is retracted by being pushed with the plug 2 so that the communicating hole 27 formed in the cylindrical wall of the movable valve 24 opens into the large-diameter portion of the secondary fluid passage portion 4b, thereby allowing the large-diameter portion of the secondary fluid passage portion 4b to communicate with the fluid passage 26 of the movable valve 24, that is, allowing the secondary fluid passage portion 4b to open.

Upon completion of the connection between the socket 1 and the plug 2, the locking sleeve 19 is in its advanced position. Consequently, a space is formed between the abutment 50 provided on the locking sleeve 19 and the second control portion 44b of the cam 44. Thus, the cam 44 is released from the restraint and allowed to rotate.

If, in this state, the ball rotating shaft 6 is rotated by operating the handle 43, the ball valve 5 also rotates with the rotation of the ball rotating shaft 6. First, the sub-valve bore 33 passes the cylindrical seal member 11 to open into the primary fluid passage portion 4a of the socket fluid passage 4 to allow the fluid in the primary fluid passage portion 4a to be delivered from the sub-valve bore 33 to the secondary fluid passage portion 4b of the socket fluid passage 4, including the outer peripheral surface of the ball valve 5, through the gap between the inner wall of the ball valve 5 and the outer wall of the ball rotating shaft 6 [FIG. 4(B)]. Then, the valve bore 7 passes the cylindrical seal member 11 to open into the socket fluid passage 4. Thus, the socket fluid passage 4 opens [FIG. 4(C)].

As stated above, before the valve bore 7 opens into the socket fluid passage 4, the sub-valve bore 33 of the ball valve 5 passes the cylindrical seal member 11 to open into the primary fluid passage portion 4*a*, so that the fluid in the primary fluid passage portion 4*a* enters the gap between the inner wall of the ball valve 5 and the outer wall of the ball rotating shaft 6 through the sub-valve bore 33 and is delivered to the secondary fluid passage portion 4*b* of the socket fluid passage 4, including the outer peripheral surface of the ball valve 5. Consequently, the differential pressure between the fluid pressure in the primary fluid passage portion 4*a* and that in the secondary fluid passage portion 4*b* reduces, so that the load applied to the cylindrical seal member 11 on the primary fluid passage side reduces. Therefore, the ball valve rotating operation, which is carried out thereafter, is facilitated. In addition, it is possible to suppress damage to the cylindrical seal member 11, which might otherwise be caused by the opening edge of the valve bore 7 when the valve bore 7 passes the cylindrical seal member 11 as the ball valve 5 further rotates. Accordingly, the durability of the cylindrical seal member 11 increases.

When the valve bore 7 opens into the socket fluid passage 4 as stated above, the fluid flowing from the primary fluid passage portion 4*a* to the secondary fluid passage portion 4*b* is delivered to the plug 2 through the fluid passage 26 of the movable valve 24. The fluid pressure of the delivered fluid retracts the movable valve 54 provided in the plug fluid passage 52 of the plug 2, causing the plug fluid passage 52 to open. Thus, the fluid is supplied from the socket 1 to the plug 2.

When the ball valve 5 is in its closed position, the purge outlet 35*b* of the purge passage 35 formed in the ball rotating shaft 6 is in communication with the fluid recovery passage 36. When the ball rotating shaft 6 is rotated in the direction for opening the ball valve 5, the purge outlet 35*b* moves out of communication with the fluid recovery passage 36 [FIG. 5(C)]. Accordingly, there is no possibility that the fluid flowing through the socket fluid passage 4 may flow from the purge passage 35 to the fluid recovery passage 36 when the fluid is supplied to the plug 2.

Meanwhile, the ball rotating shaft 6 is under the influence of the fluid pressure present in the purge passage 35. However, the ball rotating shaft 6 is provided with the pressure balancing member 41, which is disposed at a side of the ball rotating shaft 6, opposite to the pressure contact position of the cylindrical seal member 39 disposed at the communicating opening of the fluid recovery passage 36, that is communicable with the purge outlet 35*b* of the purge passage 35. The pressure balancing member 41 applies a contact pressure to the ball rotating shaft 6 that balances the contact pressure applied by the cylindrical seal member 39. Therefore, the portion of the ball rotating shaft 6 where the purge outlet 35*b* is provided is subjected to back pressure at both sides of the ball rotating shaft 6. Consequently, radial loads applied to the ball rotating shaft 6 balance each other. Accordingly, the bending moment acting on the purge outlet portion of the ball rotating shaft 6 is theoretically zero. Thus, it is possible to improve both the rotational operability of the ball rotating shaft 6 and the sealability of the cylindrical seal member 39.

Next, disconnection of the plug 2 from the socket 1 will be described. To disconnect the plug 2 from the socket 1, the locking sleeve 19 is retracted to cancel its action of pressing the lock members 17 in the centripetal direction. If the locking sleeve 19 is attempted to be retracted in the state where the ball valve 5 is open, the abutment 50 provided on the locking sleeve 19 abuts on the first control portion 44*a* of the cam 44 to block retraction of the locking sleeve 19 that is in its advanced position. Thus, the locking sleeve 19 cannot be retracted. Therefore, the operator grips the handle 47, which holds the socket 1, with one hand, and operates the handle 43 with the other hand to rotate the ball rotating shaft 6, thereby changing the angle of the valve bore 7 of the ball valve 5 to close the socket fluid passage 4. In response to the shaft rotating operation, the cam 44 also rotates to allow the locking sleeve 19 to retract.

When the socket fluid passage 4 is closed by changing the angle of the valve bore 7 of the ball valve 5 through rotation of the ball rotating shaft 6 as stated above, the purge outlet 35*b* of the purge passage 35 formed in the ball rotating shaft 6 comes in communication with the fluid recovery passage 36. Therefore, before the locking sleeve 19 is retracted to disconnect the plug 2 from the socket 1, the fluid in the secondary fluid passage portion 4*b* of the socket fluid passage 4 and in the distal end portion of the plug 2 is recovered from the fluid recovery passage 36 through the purge passage 35 formed in the ball rotating shaft 6. At this time, the recovery of the fluid through the purge passage 35 is allowed after the valve bore 7 and the sub-valve bore 33 have completely passed the sealing surface of the cylindrical seal member 11. Therefore, excess wear of the cylindrical seal member 11 by the opening edge of the valve bore 7 is suppressed.

As a result of the above-described operation, the pressure in the secondary fluid passage portion 4*b* of the socket 1 reduces, so that the movable valve 54 provided in the plug fluid passage 52 of the plug 2 is advanced by the urging force of the spring 53 to close the plug fluid passage 52. Therefore, the fluid in the secondary fluid passage portion 4*b* and the distal end portion of the plug 2 can be recovered. Thereafter, the locking sleeve 19 is retracted. Thus, the plug 2 can be disconnected from the socket 1 safely and easily.

If the collar 22 is moved mistakenly or due to an error in connection of the plug 2 to the socket 1, the lock members 17 move in the centripetal direction, and the locking sleeve 19 is advanced to allow the cam 44 to rotate. However, the movable valve 24 provided in the secondary fluid passage portion 4*b* of the socket fluid passage 4 of the socket 1 is moved to its advanced position to close the secondary fluid passage portion 4*b*. Therefore, even if the ball valve 5 is accidentally rotated to open the socket fluid passage 4 by the operation of the handle 43, it is possible to prevent the fluid from flowing out.

As has been stated above, the present invention offers the following advantages. In the pipe coupling according to the first aspect of the present invention, the socket fluid passage in the socket is opened or closed with a ball valve incorporated therein. A cylindrical seal member is disposed in the primary fluid passage portion of the socket fluid passage through which a fluid is supplied into the socket. The cylindrical seal member is in pressure contact with the ball valve to seal between the ball valve and the inner wall of the socket fluid passage. The ball valve is rotatable to open when the socket and the plug are locked to each other by the lock mechanism. The ball valve is provided with a sub-valve bore that allows the fluid in the primary fluid passage portion of the socket fluid passage to be delivered to the secondary fluid passage portion of the socket fluid passage through the ball valve, before the valve bore of the ball valve opens into the socket fluid passage when the ball valve is rotated. Therefore, if the ball valve in its closed position is rotated after the completion of connection of the socket and the plug, before the valve bore of the ball valve opens into the primary fluid passage portion of the socket fluid passage, the sub-valve bore of the ball valve passes the cylindrical seal member to open into the primary fluid passage portion, thereby allowing the fluid in the primary fluid passage portion to be delivered from the sub-valve bore to the secondary fluid passage portion of the socket fluid passage, including the outer peripheral surface of the ball valve, through the gap between the ball valve inner wall and the outer wall of the ball rotating shaft. Consequently, the differential pressure between the fluid pressure in the primary fluid passage portion and that in the secondary fluid passage portion reduces, so that the load applied to the cylindrical seal member on the primary fluid passage side reduces. Therefore, the ball valve rotating operation, which is carried out thereafter, is facilitated. In addition, it is possible to suppress damage to the cylindrical seal member, which might otherwise be caused by the opening edge of the valve bore of the ball valve when the valve bore passes the cylindrical seal member as the ball valve further rotates. Hence, the durability of the cylindrical seal member can be increased.

In the pipe coupling according to the second aspect of the present invention, the secondary fluid passage portion of the socket fluid passage is provided with a movable valve that retracts to open the secondary fluid passage portion when it is pushed by the distal end of the plug as inserted into the socket. When the plug is removed from the socket, the movable valve advances to close the secondary fluid passage portion. Therefore, even if the ball valve is rotated to open when the plug is not connected to the socket, the fluid flowing from the primary fluid passage portion to the secondary fluid passage portion is prevented from leaking to the outside of the socket by the movable valve closing the secondary fluid passage portion. Further, the ball rotating shaft for rotating the ball valve is formed with a purge passage having a purge inlet that opens into a secondary space formed in the secondary fluid passage portion between the ball valve and the movable valve. The purge passage further has a purge outlet that opens outside the socket fluid passage. The purge outlet is capable of assuming either of two positions; namely, a position where the purge outlet communicates with a fluid recovery passage provided in the socket, and a position where it does not, according to a difference in rotation angle of the ball rotating shaft. When the rotation angle of the ball rotating shaft is such that the valve bore of the ball valve is not open into the socket fluid passage, the purge outlet and the fluid recovery passage are in communication with each other. Therefore, when the plug is to be disconnected from the socket, if the ball rotating shaft is rotated to close the ball valve, the purge outlet and the fluid recovery passage come into communication with each other, thereby allowing the fluid in the secondary fluid passage portion of the socket and in the plug to be recovered from the fluid recovery passage through the purge passage formed in the ball rotating shaft. Recovery of the fluid from the socket secondary fluid passage portion and the plug enables the plug to be disconnected from the socket safely and easily.

In the pipe coupling according to the third aspect of the present invention, a cylindrical seal member is disposed at a communicating opening of the fluid recovery passage that is communicable with the purge outlet of the purge passage formed in the ball rotating shaft. The cylindrical seal member is in pressure contact with the ball rotating shaft to seal between the ball rotating shaft and the inner wall of the fluid recovery passage when the purge outlet and the fluid recovery passage are not in communication with each other. In addition, a pressure balancing member is disposed at a side of the ball rotating shaft opposite to the pressure contact position of the cylindrical seal member disposed in the fluid recovery passage. The pressure balancing member applies a contact pressure to the ball rotating shaft that balances the contact pressure applied by the cylindrical seal member. Therefore, the portion of the ball rotating shaft where the purge outlet is provided is subjected to back pressure at both sides of the ball rotating shaft. Consequently, radial loads applied to the ball rotating shaft balance each other. Accordingly, the bending moment acting on the purge outlet portion of the ball rotating shaft is theoretically zero. Thus, it is possible to improve both the rotational operability of the ball rotating shaft and the sealability of the cylindrical seal member.

In the pipe coupling according to the fourth aspect of the present invention, the lock mechanism of the socket and the plug includes a locking sleeve fitted on the outer periphery of the distal end portion of the socket body. When advanced, the locking sleeve presses lock members in a centripetal direction. When retracted, the locking sleeve releases the lock members from its pressing action. The lock mechanism further includes an engaging groove formed on the outer periphery of the plug. The engaging groove is engageable with the lock members. The ball rotating shaft is provided with a handle for rotating it outside the socket body and is further provided with a cam rotating together with the ball rotating shaft as one unit. The cam has a first control portion and a second control portion. The locking sleeve is provided with an abutment. When the locking sleeve is in its retracted position., the abutment is positioned in close proximity to the second control portion of the cam, so that if the cam is attempted to be rotated, the abutment abuts on the second control portion to prevent rotation of the cam, thereby preventing the ball valve from being opened. When the locking sleeve is in its advanced position, the abutment is away from the cam to allow rotation of the cam. If the locking sleeve is attempted to be retracted when it is in its advanced position and the ball valve is open, the abutment abuts on the first control portion of the cam to prevent retraction of the locking sleeve that is in its advanced position. Therefore, when the plug is not connected to the socket, the ball valve cannot be opened. The plug cannot be disconnected from the socket unless the ball valve is closed. Therefore, the pipe coupling is excellent in safety.

In the pipe coupling according to the fifth aspect of the present invention, the cam is in the shape of a partially cut disk. A circular arc-shaped outer peripheral edge of the cam is defined as the first control portion, and a cut portion of the cam is defined as the second control portion. Therefore, the production of the first and second control portions is facilitated, and an overall cost reduction can be achieved.

The invention claimed is:

1. A pipe coupling comprising:
  a socket and a plug that have an appropriate lock mechanism and are detachably connected to each other;
  said socket having a socket fluid passage that is opened or closed with a ball valve incorporated therein, said socket fluid passage having a primary fluid passage portion through which a fluid is supplied into said socket, said primary fluid passage portion being provided therein with a cylindrical seal member in pressure contact with said ball valve to seal between said ball valve and an inner wall of said socket fluid passage, and said ball valve being rotatable to open when said socket and said plug are locked to each other by said lock mechanism;

wherein said ball valve is provided with a sub-valve bore that allows the fluid in the primary fluid passage portion of said socket fluid passage to be delivered to a secondary fluid passage portion of said socket fluid passage through said ball valve before a valve bore of said ball valve opens into said socket fluid passage when said ball valve is rotated;

wherein the secondary fluid passage portion of said socket fluid passage is provided with a movable valve that retracts to open said secondary fluid passage portion when it is pushed by a distal end of said plug as inserted into said socket, and when said plug is removed from said socket, said movable valve advances to close said secondary fluid passage portion;

said ball valve having a ball rotating shaft to rotate it, said ball rotating shaft being formed with a purge passage having a purge inlet that opens into a secondary space formed in said secondary fluid passage portion between said ball valve and said movable valve, said purge passage further having a purge outlet that opens outside said socket fluid passage, said purge outlet being capable of assuming either of two positions, including one where said purge outlet communicates with a fluid recovery passage provided in said socket, and another where it does not, according to a difference in rotation angle of said ball rotating shaft, wherein when the rotation angle of said ball rotating shaft coincides with an angle at which the valve bore of said ball valve is open into said socket fluid passage, the purge outlet is not in communication with the fluid recovery passage, whereas when the rotation angle of said ball rotating shaft is such that the valve bore of the ball valve is not open into said socket fluid passage, the purge outlet is in communication with the fluid recovery passage.

2. A pipe coupling according to claim 1, wherein a cylindrical seal member is disposed at a communicating opening of the fluid recovery passage that is communicable with the purge outlet of the purge passage formed in said ball rotating shaft, said cylindrical seal member being in pressure contact with said ball rotating shaft to seal between said ball rotating shaft and an inner wall of the fluid recovery passage when the purge outlet and the fluid recovery passage are not in communication with each other, and wherein a pressure balancing member is disposed at a side of said ball rotating shaft opposite to a position at which said cylindrical seal member disposed in said fluid recovery passage is in pressure contact with said ball rotating shaft, said pressure balancing member being adapted to apply a contact pressure to said ball rotating shaft that balances a contact pressure applied by said cylindrical seal member.

3. A pipe coupling according to claim 1, wherein said lock mechanism of said socket and plug comprises:

a locking sleeve fitted on an outer periphery of a distal end portion of a socket body, said locking sleeve being arranged such that when advanced, the locking sleeve presses lock members in a centripetal direction, whereas when retracted, the locking sleeve releases the lock members from its pressing action; and an engaging groove formed on an outer periphery of said plug, said engaging groove being engageable with said lock members;

said ball rotating shaft being provided with a handle for rotating it outside the socket body and further provided with a cam rotating together with the ball rotating shaft as one unit, said cam having a first control portion and a second control portion;

wherein said locking sleeve is provided with an abutment arranged such that when the locking sleeve is in its retracted position, the abutment is positioned in close proximity to the second control portion of said cam, so that if the cam, is attempted to be rotated, the abutment abuts on the second control portion to prevent rotation of the cam, thereby preventing the ball valve from being opened, whereas when the locking sleeve is in its advanced position, the abutment is away from the cam to allow rotation of the cam, and if the locking sleeve is attempted to be retracted when it is in its advanced position and the ball valve is open, the abutment abuts on the first control portion of the cam to prevent retraction of the locking sleeve that is in its advanced position.

4. A pipe coupling according to claim 3, wherein said cam is in a shape of a partially cut disk, wherein a circular arc-shaped outer peripheral edge of the cam is defined said first control portion, and a cut portion of the cam is defined as said second control portion.

* * * * *